United States Patent [19]

Kawakami

[11] Patent Number: 4,618,812
[45] Date of Patent: Oct. 21, 1986

[54] DIRECT CURRENT POWER CONTROL ON SELECTABLE VOLTAGE STEP-UP AND STEP-DOWN

[75] Inventor: Chikuni Kawakami, Kaisei, Japan

[73] Assignee: Fuji Photo Film Co., Ltd., Kanagawa, Japan

[21] Appl. No.: 713,886

[22] Filed: Mar. 20, 1985

[30] Foreign Application Priority Data

Apr. 11, 1984 [JP] Japan .................................. 59-70898

[51] Int. Cl.$^4$ ............................................. G05F 1/618
[52] U.S. Cl. .................................... 323/224; 323/266; 323/268; 323/285
[58] Field of Search .............. 323/222, 224, 268, 266, 323/282, 284, 285

[56] References Cited

U.S. PATENT DOCUMENTS 4,161,023  7/1979  Goffeau ........................... 323/224 X

FOREIGN PATENT DOCUMENTS

| 2250575 | 4/1974 | Fed. Rep. of Germany | 323/222 |
| 2497421 | 7/1982 | France | 323/222 |
| 0137414 | 10/1981 | Japan | 323/224 |
| 0141773 | 11/1981 | Japan | 323/222 |

Primary Examiner—Peter S. Wong
Attorney, Agent, or Firm—Birch, Stewart, Kolasch & Birch

[57] ABSTRACT

A DC power circuit for converting an input DC voltage into a predetermined output DC voltage includes a first switching device for switching a DC input voltage, an inductance device connected to an output terminal of the first switching device, a second switching device connected to an output terminal of the inductance device for switching an output from the inductance device, a driver circuit for comparing the output DC voltage with a first reference voltage to drive the first and second switching devices in accordance with the comparison, and a control circuit for comparing the input DC voltage with a second reference voltage to enable the driver circuit to selectively drive either the first or second switching device in accordance with the comparison. The control circuit primes or enables the second switching device to thereby step up the input DC voltage to produce a resultant output voltage from the inductance device when the input DC voltage is lower than the second reference voltage, and primes or enables the first switching device to thereby step down the input DC voltage to produce the resultant output voltage from the inductance device when the input DC voltage is higher than the second reference voltage.

3 Claims, 3 Drawing Figures

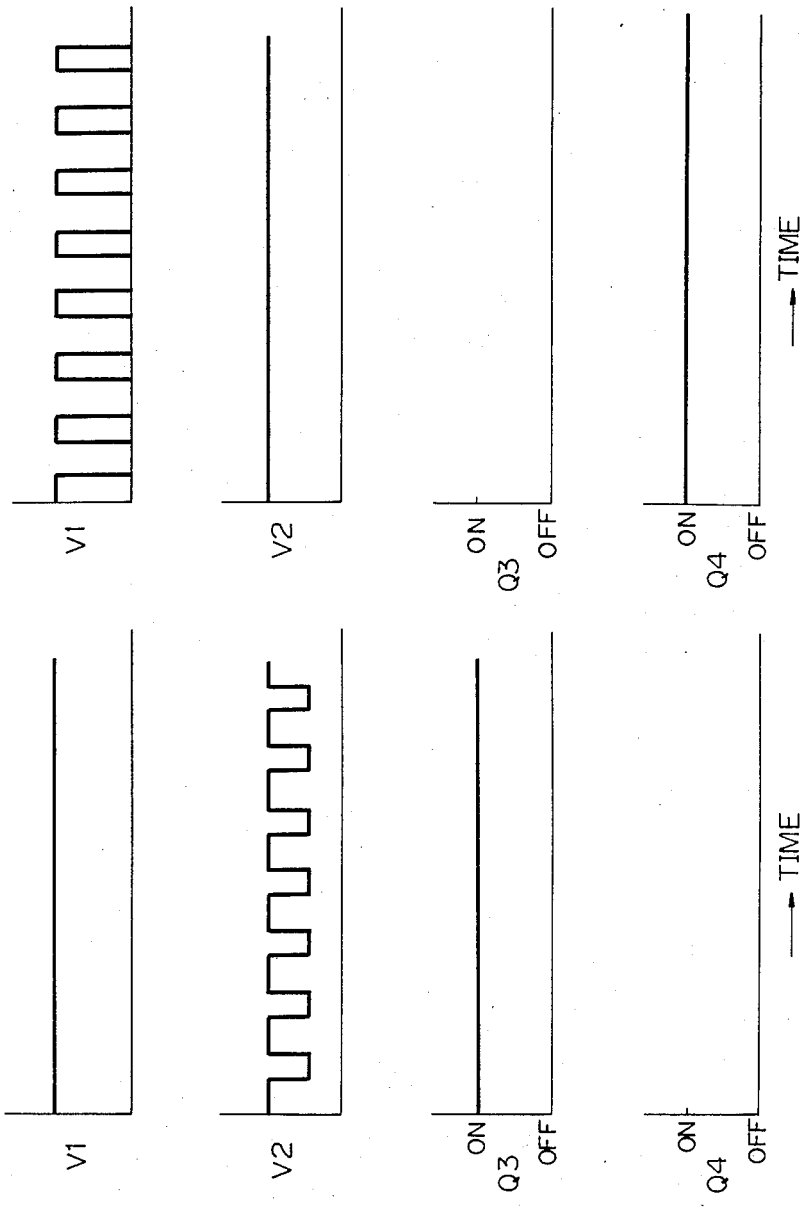

DIRECT CURRENT POWER CONTROL ON SELECTABLE VOLTAGE STEP-UP AND STEP-DOWN

BACKGROUND OF THE INVENTION

1. Field of the Invention

The present invention relates to direct current (DC) power control, and in particular, to a DC power control circuit for converting an input DC voltage into a predetermined output DC voltage.

2. Description of the Prior Art

Conventionally, there has been utilized a forward-bias-type DC power circuit which includes a transformer for converting an input DC voltage, variable in a wide voltage range, into a predetermined output DC voltage. Among the DC power circuits of this type, there is a power circuit having a transistor serially connected to a primary winding of a transformer. Conductivity of the transistor is controlled, for example, in the manner of a pulse-width modulation (PWM) in response to an output voltage of the circuit, thereby producing a predetermined DC output voltage across the secondary winding regardless of the input DC voltage. Both step-up and step-down functions with respect to the input voltage can be advantageously achieved by a single circuitry constructed in a relatively simple configuration. On the other hand, however, the DC power circuit has such problems that leaking magnetic flux of the transformer causes noise within the electronic circuit disposed in the vicinity thereof, and additionally only a low power conversion efficiency between the input and output can be obtained.

In order to solve the problems, there has been widely utilized a DC power control circuit comprising a choke coil in place of the transformer. This type of circuit includes a transistor serially connected to the choke coil, and the step-up and step-down of the input voltage are carried out by driving the transistor using a pulse-width modalation technique in response to an output voltage. The fly-back characteristic of the choke coil is utilized in the circuit, which advantageously develops a higher power conversion efficiency and a lower leakage flux. However, such a single power control circuit has to be dedicated to the step-up or step-down function. That is, this circuit cannot be adopted in an application in which an input voltage may change over and under with respect to an expected value of the output voltage from the power circuit.

SUMMARY OF THE INVENTION

It is therefore an object of the present invention to provide a dc power control circuit which solves the drawbacks of the prior art, and which enables both step-up and step-down with a higher power conversion efficiency without causing any disturbance to the circuits disposed in the neighborhood thereof.

In accordance with the present invention, a dc power control circuit for converting an input DC voltage into a predetermined output DC voltage comprises: first switching means for switching a DC input; inductance means connected to an output terminal of said first switching means; second switching means connected to an output terminal of said inductance means for switching an output therefrom; driver means for comparing the output DC voltage with a first reference voltage to drive said first and second switching means in accordance with the comparison; and control means for comparing the input DC voltage with a second reference voltage to enable said driver means to selectively drive said first and second switching means in accordance with the comparison; said control means priming said second switching means, when the input DC voltage is lower than the second reference voltage, to thereby step up the input DC voltage to produce a resultant output voltage from said inductance means, and priming said first switching means, when the input DC voltage is higher than said second reference voltage, to thereby step down the input DC voltage to produce the resultant output voltage from said inductance means.

BRIEF DESCRIPTION OF THE DRAWINGS

The objects and features of the present invention will become more apparent from consideration of the following detailed description taken in conjunction with the accompanying drawings in which:

FIGS. 2A and 2B plot signal waveforms which are useful for understanding the operations of the embodiment of FIG. 1.

DESCRIPTION OF THE PREFERRED EMBODIMENT

Figure 1:
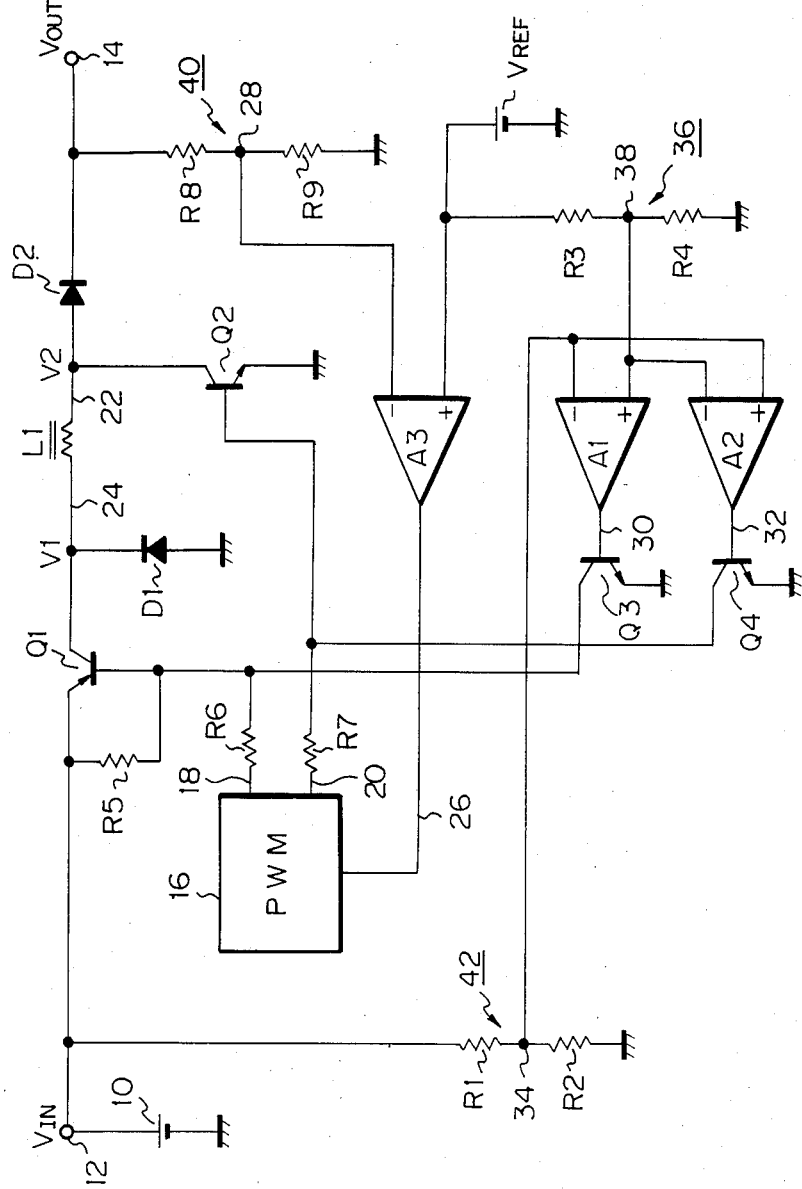
FIG. 1 is a schematic circuit diagram illustrating an embodiment of the DC power control circuit of the present invention.

Referring to the accompanying drawings, an embodiment of the DC power supply in accordance with the present invention will be described.

In the embodiment of FIG. 1, an emitter-to-collector path of a PNP transistor Q1, a choke coil L1, and a diode D2 are serially connected with the polarity shown in this diagram between an input terminal 12 connected to a DC power supply 10, such as a dry element battery, for supplying an input voltage $V_{IN}$ and an output terminal 14 for supplying an output voltage $V_{OUT}$ to a desired utility circuit.

The transistor Q1 has a base electrode connected through a resistor R6 to an output terminal of a pulse-width modulation (PWM) circuit 16. The PWM circuit 16 has another output terminal 20 connected via a resistor R7 to a base electrode of an NPN transistor Q2. The transistor Q2 has a collector connected to an output terminal 22 of the choke coil L1, and an emitter grounded. The coil L1 has an input terminal grounded through a diode D1.

The PWM circuit 16 produces a train of rectangular pulses having a preset repetition frequency from the outputs 18 and 20, the pulse width, or duration, depending upon a voltage applied to a control input terminal 26. If a positive voltage is applied to the control input terminal 26, the pulse widths of the signals from the output terminals 18 and 20 are enlarged. If a negative voltage is applied thereto, the widths are shortened. Rectangular pulses developed from the output terminals 18 and 20 are in phase.

The control terminal 26 is connected to an output of a comparator A3 which has an inverting input (−) connected to an intermediate or connecting node 28 of a voltage divider 40, which comprises resistors R8 and R9. Voltage divider 40 is connected to the output terminal 14 of the DC power control circuit constructed according to the teachings of the present application. The comparator A3 has a noninverting input (+) supplied with a reference voltage $V_{REF}$.

The comparator A3, which compares the value of voltages at these two input terminals, will produce a positive voltage from the output terminal 26, in this embodiment, if the voltage of the inverting input (−) is lower than that of the noninverting input (+), that is, when the voltage at the intermediate node 28 of the voltage divider 40 connected to the output terminal 14 of this system is lower than the reference voltage $V_{REF}$. If the voltage at the intermediate node 28 is higher than the reference voltage $V_{REF}$, a negative voltage will be developed from the output terminal 26. Consequently, the widths of the rectangular pulses delivered from the output terminals 18 and 20 of the modulator 16 are enlarged in the former case, and are shortened in the latter case.

The transistor Q1 has a base electrode grounded through a collector-to-emitter path of a transistor Q3. Similarly, the transistor Q2 has a base electrode grounded through a collector-to-emitter path of a transistor Q4.

The base electrodes of these transistors Q3 and Q4 are respectively connected to output terminals 30 and 32 of comparators A1 and A2. The input terminal 12 of the circuit of FIG. 1 is connected to A voltage divider 42 comprising resistors R1 and R2. An intermediate node 34 of the voltage divider 42 is connected to an inverting input (−) of the comparator A1 and a noninverting input (+) of the comparator A2, respectively. A noninverting input (+) of the comparator A1 and an inverting input (−) of the comparator A2 are commonly connected to an intermediate node 38 of a voltage divider 36 comprising resistors R3 and R4. The reference voltage $V_{REF}$ is supplied to voltage divider 36.

The comparator A1, which compares the voltages at the two input terminals thereof, will develop a high-level potential on the output 30 to energize the base electrode of the transistor Q3 if the voltage of the inverting input (−) is lower than that of the noninverting input (+), that is, if the node 34 of the voltage divider 42 is lower in voltage than the node 38 of the voltage divider 36. If the node 34 is higher in voltage than the node 38, a low-level potential is developed on the output 30 to deenergize the base electrode of the transistor Q3.

Similarly, the comparator A2, which compares two voltages at the two input terminals, will develop a low-level potential on the output 32 to deenergize the base electrode of the transistor Q4 if the noninverting input (+) is lower in voltage than the inverting input (−), that is, the node 34 of the voltage divider 36 is lower in voltage than the node 38 of the voltage divider 36. If the node 34 is higher in voltage than the node 38, a high-level potential is developed on the output 32 to deenergize the base electrode of the transistor Q4.

To effect the comparison operations described above, the threshold level $V_{TH}$ of the comparators A1 and A2 functions depending on the reference voltage $V_{REF}$ and resistors R1 to R4. That is, the following equation is satisfied.

$$V_{TH} = V_{REF}(R1+R2)R4/[R2(R3+R4)]$$

In operation, the input terminal 12 is selectively connectable to a dry element battery unit having a rated output voltage of four volts or 12 volts, for example. In either case, the output terminal 14 is connectable to a utility device which requires a rated power voltage of nine volts.

When a battery unit having a rated output voltage of four volts is connected as the DC power 10, for example, the voltage at the node 34 of the voltage divider 42 becomes lower than that at the node 38 of the voltage divider 36. As depicted in FIG. 2A, the voltage at the output 30 of the comparator A1 is set to the high-level potential to energize the base electrode of the transistor Q3, so that the transistor Q3 becomes conductive (ON), which in turn causes the transistor Q1 to be sufficiently conductive (ON). On the other hand, the low-level potential is developed from the output 32 of the comparator A2 to deenergize the base electrode of the transistor Q4, which thus becomes nonconductive (OFF). As described hereinabove, the base electrode of the transistor Q2 is controllable in response to the output 20 of the pulse-width modulator 16. The transistor Q2 is thus primed.

Accordingly, the control input terminal 26 of the modulator 16 is applied with a voltage in accordance with the difference of the voltage at the node 28 from the reference voltage $V_{REF}$, so that the modulator 16 produces responsively thereto pulses subjected to the pulse-width modulation from the terminals 18 and 20. Although the base electrode of the transistor Q1 is substantially clamped to the ground level by the conductive transistor Q3, the base electrode of the transistor Q2 can be controlled by the output 20 of the modulator 16 because of the nonconductive transistor Q4. Consequently, the transistor Q2 is subjected to the pulse-width modulation, and hence a voltage V2 on the output terminal of the choke coil L1 undergoes a pulse-width modulation as illustrated in FIG. 2A.

The transistor Q1 is completely conductive in this state, so that a voltage V1 on the input terminal of the choke coil L1 is substantially equal to the input voltage $V_{IN}$ of this circuit. When the voltage V2 on the output terminal of the coil L1 is chopped as described above, a fly-back effect takes place due to the inductance of the coil L1 to retain a current to continue flowing through the coil L1. A voltage caused by the fly-back effect is added to the input voltage to step up the output voltage $V_{OUT}$. The magnitude of the step-up operation is controlled in response to a pulse width subjected to a pulse-width modulation through the voltage divider 40 and the modulator 16. Thus, a predetermined, rated output voltage $V_{OUT}$, which is nine volts in this example, is delivered to the output terminal 14.

Similarly, when a battery unit having a rated output voltage of 12 volts is connected as the DC power supply 10 for example, the potential at the node 34 of the voltage divider 42 becomes higher than that at the node 38 of the voltage divider 36. As shown in FIG. 2B, the voltage at the output 30 of the comparator A1 is then set to the low level to deenergize the base electrode of the transistor Q3, which is in turn caused to be nonconductive to make the transistor Q1 nonconductive. Consequently, the base electrode of the transistor Q1 can be controlled by the output 18 from the pulse-width modulator 16. The transistor Q1 is thus primed. On the other hand, the output 32 from the comparator A2 is set to the high level to energize the base electrode of the transistor Q4, which becomes then completely conductive. Thus, the base electrode of the transistor Q2 becomes completely nonconductive.

As described above, the control input terminal 26 of the modulator 16 is applied a voltage in accordance with the difference of the voltage at the node 28 from the reference voltage $V_{REF}$, so that the modulator 16 produces, in response thereto, pulses pulse-width modulationed at terminals 18 and 20. The base electrode of the transistor Q2 is substantially clamped to the ground level by the conductive transistor Q4, and hence the transistor Q2 is set to the blocked state. The base electrode of the transistor Q1, however, can be controlled by the output 18 from the modulator 16 because of the nonconductive transistor Q3. The transistor Q1 is therefore subjected to pulse-width modulation, and thus the voltage V1 on the input terminal of the choke coil L1 undergoes a pulse-width modulation as depicted in FIG. 2B.

When the voltage V1 on the input terminal of the coil L1 is chopped as described above, a current is conducted through the coil L1 in proportion to the ratio of the pulse-width with respect to the repetitions period to accomplish the step-down on the rated output voltage $V_{OUT}$ by virtue of the fly-back effect due to the inductance of the coil L1. The magnitude of the step-down is controlled in response to the ratio of the pulse width to the repetitions period of the pulse-width modulation through the voltage divider 40 and the modulator 16. Consequently, the predetermined rated output voltage $V_{OUT}$, which is nine volts in this example, is delivered to the output terminal 14 also in this case.

Although a predetermined value of the output voltage is retained even when the input voltage varies extensively in the embodiment, the concept of the present invention is also applicable to an application in which a desired value of the output voltage is to be generated from a predetermined value of the input voltage. Additionally, the pulse-width modulation is utilized for driving the transistors Q1 and Q2 in the embodiment. The driving technique, however, is not limited by this example, and a pulse-count modulation as well as a frequency modulation may also be applicable.

In accordance with the present invention, since a transformer is not included, the disturbance on the peripheral circuits due to the leaking magnetic flux is removed, and the voltage step-up and step-down are achieved for a wide range of input voltage with a higher power conversion efficiency.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A DC power control circuit for converting an input DC voltage into an output DC voltage of a predetermined value comprising:
   an input terminal receiving said input DC voltage;
   a first inductor having an induction input terminal and an induction output terminal;
   first semiconductor switch having a control terminal and first and second controlled terminals;
   an output terminal developing said output DC voltage;
   said first inductor and said controlled terminals of said first semiconductor switch being serially connected between said input terminal and said output terminal;
   a second semiconductor switch having a control terminal and first and second controlled terminals, said controlled terminals of said second semiconductor switch being connected between said inductor output terminal and ground;
   driver means, operatively connected to said output terminal, for comparing the output DC voltage with a first reference voltage and for modulating the conduction of said first and second semiconductor switches in response thereto, said drive means being operatively connected to said control terminals of said first and second switch means; and
   control means, operatively connected to said input terminal, for comparing the input DC voltage with a second reference voltage to selectively enable said drive means to modulate the conduction of only one of said first and second semiconductor switches,
   said control means including,
      first and second comparator means, operatively connected to said input terminal for comparing said input DC voltage with said second reference voltage,
      a third semiconductor switch having a control terminal connected to said first comparator means, and first and second controlled terminals connected between the control terminal of said first semiconductor switch and ground, and
      a fourth semiconductor switch having a control terminal connected to said second comparator means, and first and second controlled terminals connected between the control terminal of said second semiconductor switch and ground;
   said control means, when said input DC voltage is lower than said second reference voltage, disabling said first semiconductor switch to allow said drive means to modulate the conduction of only said second semiconductor switch;
   said control means, when said input DC voltage is greater than said second reference voltage, disabling said second semiconductor switch to allow said drive means to modulate the conduction of only said first semiconductor switch.

2. The control circuit of claim 1, wherein said first, second, third, and fourth semiconductor swithces comprise transistors, each having a base as a control terminal, a collector as a first controlled terminal, and an emitter as a second controlled terminal.

3. A control circuit in accordance with claim 1, wherein said driver means comprises:
   third comparator means for comparing the output DC voltage with the first reference voltage and providing a comparison output indicative thereof; and
   pulse-width modulator means responsive to said third comparator means for producing a train of pulses having a duration in accordance with said comparison output;
   said first and second semiconductor switches being interconnected to said modulator means to be gated by said train of pulses.

* * * * *